No. 616,382. Patented Dec. 20, 1898.
W. WILGUS.
DITCHING MACHINE.
(Application filed Feb. 19, 1898.)
(No Model.) 2 Sheets—Sheet 1.
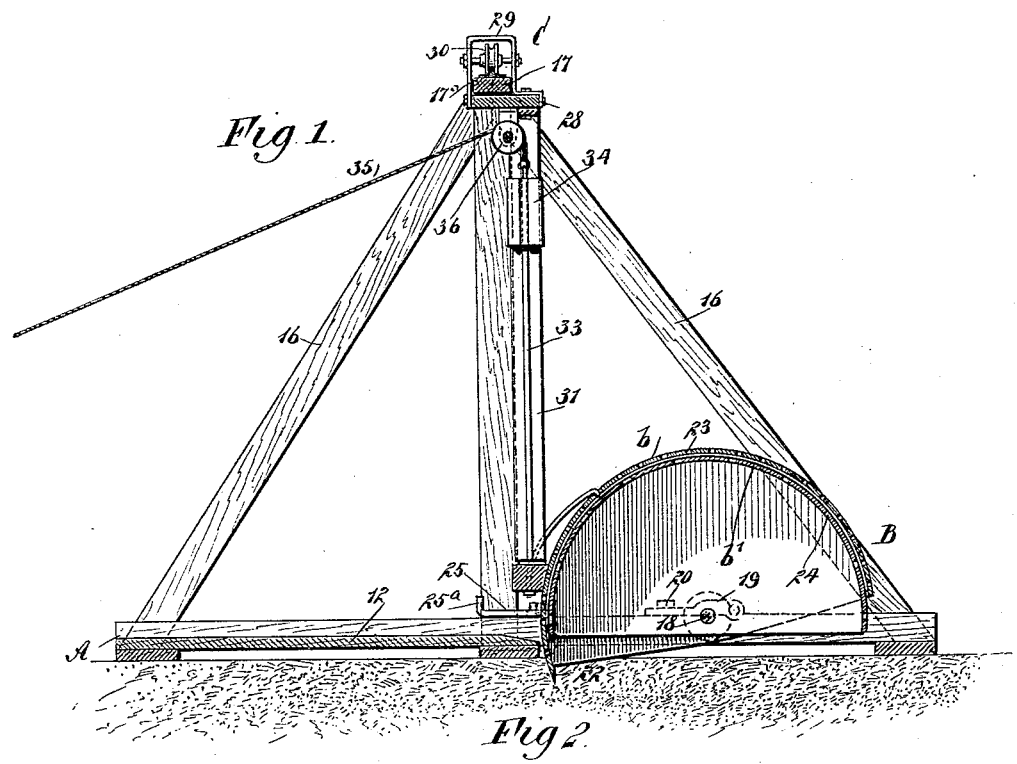
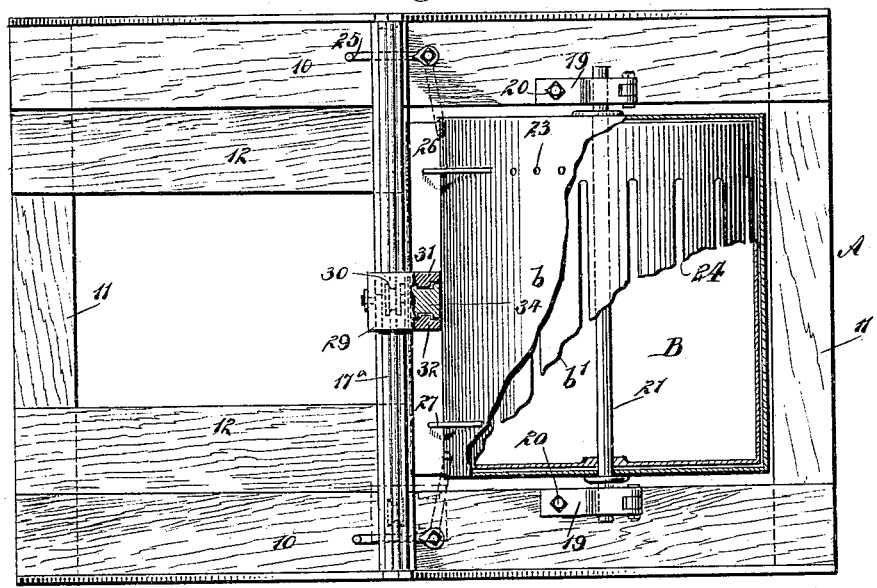
WITNESSES: INVENTOR
BY
ATTORNEYS.

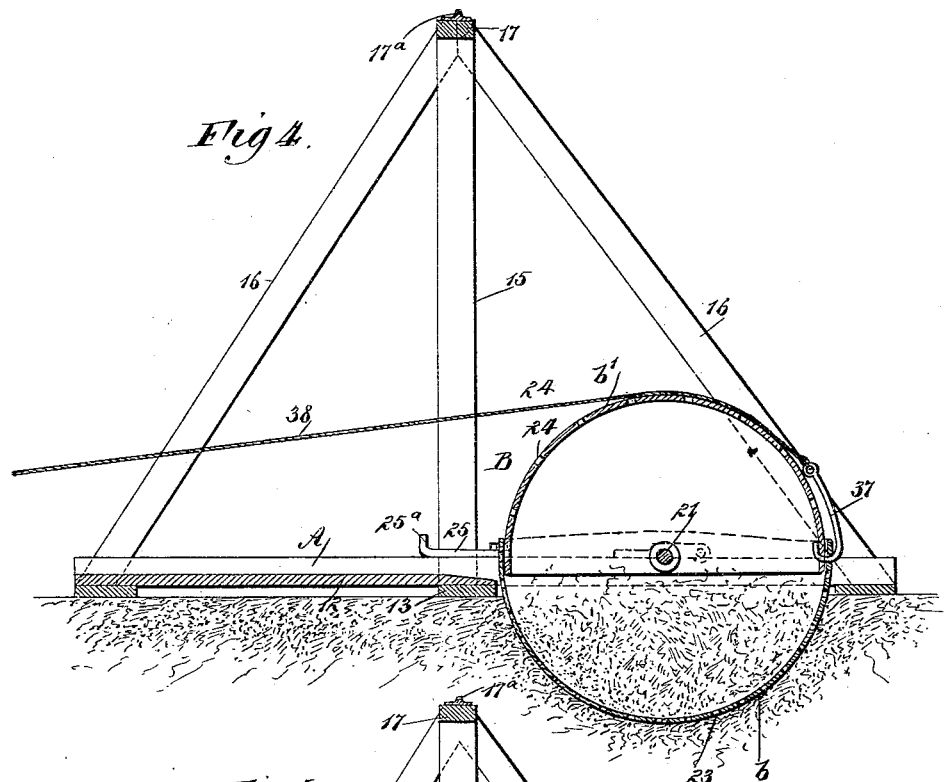
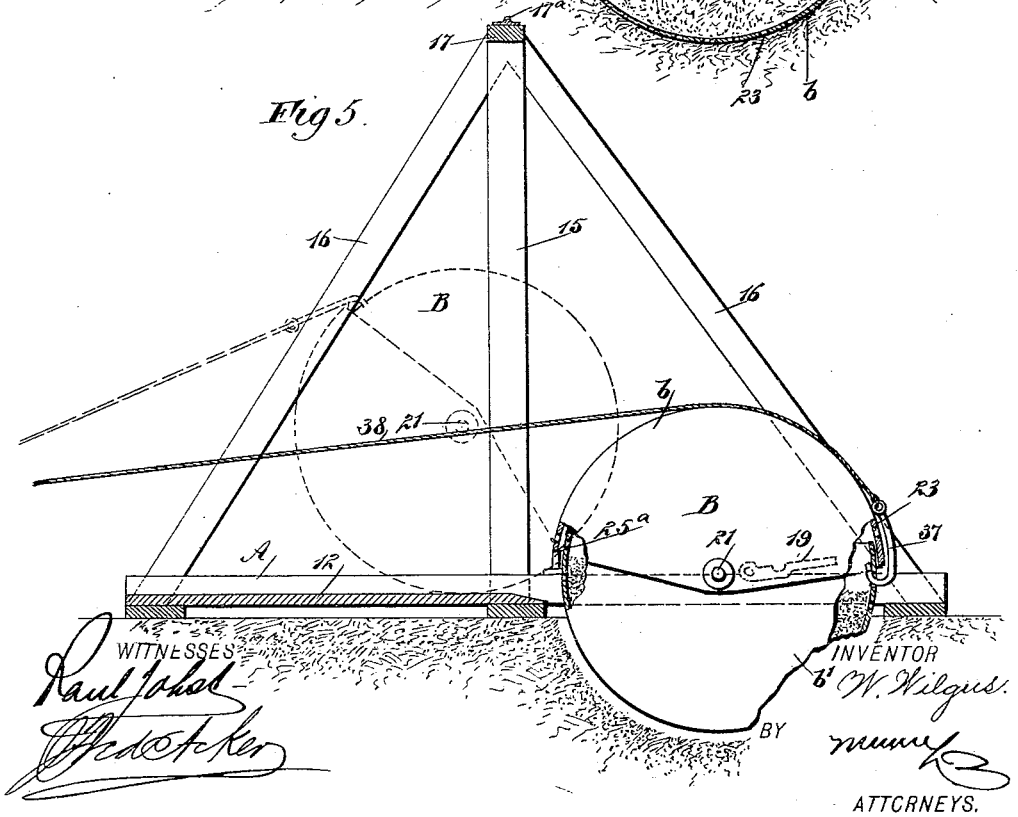

UNITED STATES PATENT OFFICE.

WILLIAM WILGUS, OF LAFAYETTE, INDIANA.

DITCHING-MACHINE.

SPECIFICATION forming part of Letters Patent No. 616,382, dated December 20, 1898.

Application filed February 19, 1898. Serial No. 670,874. (No model.)

*To all whom it may concern:*

Be it known that I, WILLIAM WILGUS, of Lafayette, in the county of Tippecanoe and State of Indiana, have invented a new and Improved Ditching-Machine, of which the following is a full, clear, and exact description.

The object of my invention is to provide a ditching-machine which will be very simple, durable, and economic and capable of being readily moved from place to place and to so construct the machine that a scoop may be employed of semicircular shape and operated to enter the ground at one point, pass through the ground, and find an exit at the opposite point, means being provided for forcing the scoop into and through the ground, and whereby the scoop will be provided with a semicircular cover, both cover and scoop being pivoted upon the same shaft, so that when the cover is over the scoop a cylindrical receptacle is obtained for the dirt removed from the ground.

Another object of the invention is to provide a means for locking the cover and scoop together when the scoop has received its load, and also to provide means for releasing the cylinder, comprising the scoop and cover, from its support and rolling the said cylinder from the opening in the ground made by the scoop-section and away from said opening to any desired point where the contents of the cylinder are to be discharged. In this manner a ditch of moderate depth may be made section by section each time that the scoop-section of the cylinder has been made to enter the ground. The machine is also adapted for taking up earth for any purpose.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a vertical longitudinal section through the device, showing the two sections of the cylinder in their normal position, the scoop-section being just about to enter the ground. Fig. 2 is a plan view of the machine, parts of the driver and parts of the cylinder being broken away. Fig. 3 is a detail perspective view of the device adapted to be operated upon by the driver and adapted to be attached to the scoop-section of the cylinder. Fig. 4 is a longitudinal vertical section through the machine, the cylinder being in the position it occupies after it has received its load; and Fig. 5 is a partial vertical section through the machine and a partial sectional and end view of the cylinder, the cylinder being shown in positive lines as having been just raised from the opening in the ground formed by the scoop and in dotted lines as entirely removed from the said opening.

The base-frame A of the device consists of side beams 10, connected by end beams or sills 11, and a platform 12 is built upon the said base-frame, extending from a point near the center to one of its ends, the inner end of the platform being beveled downwardly in direction of the opposite end of the machine. A central cross-bar 13, attached to the frame, supports the inner end of the platform 12.

A superstructure is provided for the base-frame, consisting of uprights 15, one on each side of the central portion of the frame, the uprights being supported by suitable braces 16 and connected at the top by a cross-bar 17, upon which cross-bar a track $17^a$ is laid. Between the center of the base-frame and what may be termed its "forward" end a bearing 18 is produced in the top portion of each side beam 10, each bearing being covered by a hinged cap 19, secured in position by means of bolts 20 or their equivalents. The journals thus formed are adapted to receive the ends of a shaft 21, and said shaft supports a cylinder B. This cylinder is made of metal or any suitable material and in two sections, an outer section $b$ and an inner section $b'$, both sections being free to turn on the shaft, but being held against lateral movement in any suitable manner. The outer section $b$ of the cylinder is virtually a scoop, and one of its ends 22 (shown best in Fig. 1) is beveled or sharpened to a greater or less degree, since this end of the scoop-section of the cylinder is adapted to enter the ground.

The scoop-section of the cylinder is provided with series of apertures 23, so arranged that a row will be near each head of the cylinder, as illustrated in Fig. 2, whereas the inner section $b'$ of the cylinder is provided with a number of slots 24, which will permit water to escape in the event the ground taken up contains water in any quantity, and the slots 24 are sufficiently wide to permit the dirt to escape when the cylinder is closed and removed and rolled from its bearing in the machine. A latch 25 is pivoted upon the upper face of each side beam of the frame, and each latch is provided with an upturned free end 25ª, as shown in Fig. 4.

In connection with the scoop-section of the cylinder an anvil-beam 26 is employed, provided with grapple-arms 27, which are attached to the end portions of the anvil-beam and are curved outwardly therefrom, having their inner ends bent downward, so that they will be substantially hook-shaped, and may enter the apertures 23 in said scoop-section of the cylinder, as shown in Fig. 2.

A carriage C is held to travel upon the top cross-bar 17 of the frame, and this carriage usually consists of a base board or plate 28, provided with a strap 29, in which a grooved pulley 30 is mounted to revolve and travel on the track 17ª.

Parallel guide-bars 31 and 32 are secured to the plate or board 28, as shown in Fig. 1, each of the guide-bars being provided with a vertical rib 33, and between these guide-bars a hammer 34 is held to slide, such as is employed upon pile-drivers. A rope or chain 35 is connected with the said hammer and is passed over a pulley 36, suspended from the carriage C.

In the operation of the machine when it is to be transported the inner section of the cylinder is carried within the scoop-section, and both of them are brought to a position practically above the frame, so that the sections will not engage with the ground. When the place is reached where the ditch is to be made, the scoop-section of the cylinder is carried downward until its edge 22 engages with the ground. The anvil-beam is then hitched onto the scoop-cylinder in such manner that such anvil-beam will be practically below the top cross-bar 17 of the frame. The carriage C is then brought to a central position on the cross-bar 17, as shown in Fig. 2, and the hammer is permitted to drop, whereupon it will strike the anvil-beam at its center and will force the scoop-section of the cylinder into the ground to a greater or less depth. After the hammer has been raised the anvil-beam, if near the platform, is disengaged from the scoop-cylinder and again attached at the higher point and the hammer is again permitted to drop, driving the scoop-section of the cylinder farther into the ground. The blows are repeated until the scoop-section of the cylinder has been forced through the ground and its cutting edge has been driven above the surface of the ground at the opposite side of the shaft 21 at which it entered, as shown in Fig. 4. The outer or scoop section of the cylinder will now be substantially filled with material, and the cover or inner section will be above the scoop-section. These two sections are then secured together in any suitable or approved manner.

One or more grapples 37 are attached to the rear portion of the cylinder, and the covers 19 for the bearings are removed from over the journals 18. Tension is then applied to the ropes 38, connected with the grapples, causing the cylinder in its entirety to turn on the shaft 21. The latches 25 are then carried into an engagement with the outer surface of the cover-section of the cylinder, so that their upturned portions 25ª will engage with the cutting edge of the scoop-section of the cylinder when the cylinder shall have been sufficiently turned, as shown in Fig. 5, and, as shown in the same view, when tension is further exerted on the ropes 38 the cylinder will ride up on the said latches out from the ditch made by the scoop and upon the inclined portion of the platform and may then be rolled along the platform and off therefrom to any point, the contents of the cylinder escaping through the slots. The frame is then shifted to a position which will enable the cylinder when returned to its position in the frame to excavate another section of the ditch.

Having thus described my invention, I claim as new and desire to secure by Letters Patent—

1. In a ditching-machine, an excavating-cylinder consisting of a shaft, and a scoop and a cover section loosely mounted on the shaft, the said sections being capable of being connected together, as and for the purpose specified.

2. In a ditching-machine, an excavator consisting of a shaft, a cylinder carried by the shaft, comprising a scoop-section and a cover-section, both loosely mounted on the shaft, the cover-section being arranged to turn within the scoop-section and one or both of the said sections being provided with openings, as and for the purpose specified.

3. In a ditching-machine, an excavator consisting of a shaft, a cylinder carried by the shaft, comprising a scoop-section and a cover-section, both loosely mounted on the shaft, one being adapted to move within the other, the scoop-section being provided with a series of apertures, and an anvil-beam provided with grapple-arms extending therefrom, the grapple-arms being arranged to enter the apertures in the scoop-section of the cylinder, for the purpose specified.

4. In a ditching-machine, the combination, with a frame and a drop-hammer carried by the frame, of an excavator consisting of a shaft removably journaled in the frame, a cylinder carried by the said shaft, comprising a scoop-section and a cover-section, both of which are loosely mounted on the shaft, and an anvil-beam adapted for adjustable engagement with the scoop-section of the cylinder, the said anvil-beam when attached to said scoop-section being in the path of the said drop-hammer, for the purpose specified.

5. In a ditching-machine, the combination, with a frame comprising a base-section and an upper structure supported by the base, the base having a partial platform, a carriage held to slide upon a cross-bar of the upper structure, guides carried by the said carriage, a drop-hammer held to travel between the guides, means for operating said drop-hammer, and latches pivotally attached to the frame adjacent to the inner end of the base-platform, of an excavator consisting of a shaft removably journaled in the frame in front of the inner end of the base-platform, a cylinder carried by said shaft, consisting of a scoop-section and a cover-section, both loosely mounted on the shaft, and an anvil-bar adapted for adjustable connection with the scoop-section of the cylinder, which anvil-bar when attached to the cylinder is in the path of said hammer, as and for the purpose specified.

WILLIAM WILGUS.

Witnesses:
WM. E. DEVERIL,
JACOB HIEDE, Jr.